US007795589B2

(12) United States Patent
Prejean et al.

(10) Patent No.: US 7,795,589 B2

(45) Date of Patent: Sep. 14, 2010

(54) INFRARED SENSOR AND METHOD OF CALIBRATING THE SAME

(75) Inventors: Seth Prejean, Austin, TX (US); Miguel Santana, Jr., Buda, TX (US); Ronald M. Potok, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 153 days.

(21) Appl. No.: 12/175,304

(22) Filed: Jul. 17, 2008

(65) Prior Publication Data

US 2010/0012828 A1 Jan. 21, 2010

(51) Int. Cl.
*G01J 5/02* (2006.01)

(52) U.S. Cl. ...................................................... 250/343

(58) Field of Classification Search .................. 250/343
See application file for complete search history.

(56) References Cited

U.S. PATENT DOCUMENTS 5,200,023 A * 4/1993 Gifford et al. ................. 216/59
5,302,830 A * 4/1994 Shivanandan ............... 250/342
5,897,378 A * 4/1999 Eriguchi ..................... 438/707

OTHER PUBLICATIONS

Hefner et al., "A high-speed thermal imaging system for semiconductor device analysis," 2001, IEEE Semi-Therm Symposium, pp. 44-49.*

Solvay Solexis; *Galden PFPE: Reliability Testing Fluids*; www.solvaysolexis.com; 2003; pp. 1-4.

John McDonald; *Optical and Infrared FA Microscopy*; Quantum Focus Instruments Corp.; Jan. 17, 2006; pp. 1-100.

Quantum Focus Instruments Corporation; *Exclusive to Infrascope-Emissivity Correction Infrascope III*; http://www.quantumfocus.com/infrascope_emissivity_correction.htm; Mar. 19, 2008; p. 1.

Quantum Focus Instruments Corporation; *Infrascope III*; http://www.quantumfocus.com/infrascope_hot_spot_detection.htm; Mar. 19, 2008; p. 1.

* cited by examiner

*Primary Examiner*—David P Porta
*Assistant Examiner*—Kiho Kim
(74) *Attorney, Agent, or Firm*—Timothy M. Honeycutt

(57) ABSTRACT

A method includes determining a transmission of a transmissive window and a transmission of a transmissive fluid. In addition, an infrared emission of the transmissive window is determined along with an infrared emission of the transmissive fluid for at least one temperature. In a system that has an infrared sensor and an optical pathway to the infrared sensor, the transmissive window and the transmissive fluid are placed in the optical pathway. A semiconductor chip is placed in the optical pathway proximate the transmissive fluid. Radiation from the optical pathway is measured with the infrared sensor. An emissivity of the semiconductor chip is determined using the measured radiation and the determined transmissions and emissions of the transmissive window and the transmissive fluid.

21 Claims, 6 Drawing Sheets

INFRARED SENSOR AND METHOD OF CALIBRATING THE SAME

BACKGROUND OF THE INVENTION

1. Field of the Invention

This invention relates generally to semiconductor processing, and more particularly to a system to sense infrared radiation from a semiconductor chip and to methods of calibrating the same.

2. Description of the Related Art

Infrared thermal imaging is a common analysis technique used on semiconductor devices for failure analysis and design. In the past, typical thermal imaging of a functional device was done in an open air setup, that is, without any structures in the optical path of the detector. In such designs, air is used to cool the device undergoing testing. An open air setup is acceptable for parts that operate below certain power densities.

Some more recent designs of semiconductor devices exhibit much higher power densities. In some cases, more exotic cooling is required to keep the semiconductor device from failing due to thermal run away. Standard copper heat sinks used to cool the semiconductor devices in testing environments do not allow for optical access to the device itself. Yet optical access is required for thermal imaging.

One solution found in the industry for cooling a device with optical access is known as a diamond heat spreader. Since diamond is mostly transparent to the infrared spectrum, it is a good window material for thermal imaging. At the same time, the diamond can physically contact a device under test to spread and remove the heat during thermal imaging. In another conventional variant, a sealed fluid chamber is positioned on top of a semiconductor device. The fluid is infrared transparent and facilitates heat removal. The top of the chamber has a window made from an IR transparent material.

A difficulty with the conventional diamond spreader is the propensity for Newton's rings to degrade the infrared image of the semiconductor device. The Newton's rings appear due to inherent non-planarities in the upper surface of the semiconductor device and the lower surface of the diamond window. A difficulty with the conventional liquid setup is that the liquid and the upper window mask the actual count of photons emitted by the semiconductor chip. The liquid and the upper window both absorb and reflect percentages of any incident radiation, whether from the semiconductor chip, or in the case of the upper window, from both the semiconductor chip and the liquid. Without an accurate actual photon count from the semiconductor chip, a correct emissivity for the chip remains elusive.

The present invention is directed to overcoming or reducing the effects of one or more of the foregoing disadvantages.

SUMMARY OF THE INVENTION

In accordance with one aspect of the present invention, a method is provided that includes determining a transmission of a transmissive window and a transmission of a transmissive fluid. In addition, an infrared emission of the transmissive window is determined along with an infrared emission of the transmissive fluid for at least one temperature. In a system that has an infrared sensor and an optical pathway to the infrared sensor, the transmissive window and the transmissive fluid are placed in the optical pathway. A semiconductor chip is placed in the optical pathway proximate the transmissive fluid. Radiation from the optical pathway is measured with the infrared sensor. An emissivity of the semiconductor chip is determined using the measured radiation and the determined transmissions and emissions of the transmissive window and the transmissive fluid.

In accordance with another aspect of the present invention, a method is provided that includes determining a transmission $t_w$ of a transmissive window and a transmission $t_f$ of a transmissive fluid. In addition, an infrared emission $b_w(T)$ of the transmissive window is determined along with an infrared emission $b_f(T)$ of the transmissive fluid for at least one temperature. In a system that has an infrared sensor and an optical pathway to the infrared sensor, the transmissive window and the transmissive fluid are placed in the optical pathway. A semiconductor chip is placed in the optical pathway proximate the transmissive fluid. A photon count MPC from the optical pathway is measured with the infrared sensor. An actual photon count APC from the semiconductor chip is determined according to:

$$MPC=t_w t_f APC+b_w(T)+b_f(T).$$

In accordance with another aspect of the present invention, an apparatus is provided that includes an infrared sensor that has an optical pathway, a first member for holding a semiconductor chip in the optical pathway, and a second member for holding an infrared transmissive window in the optical pathway between the infrared sensor and the semiconductor chip. The transmissive window has a known transmission and a known emission at least one temperature. Either the first or the second member is operable to separate the transmissive window from the semiconductor by a preselected gap. A film of infrared transmissive fluid is in the gap for establishing fluid communication with the semiconductor chip and the transmissive window. The infrared transmissive fluid has a known transmission and a known emission at at least one temperature. A count of photons measured by the infrared sensor may be converted to a count of photons emitted by the semiconductor chip using the known transmissions and emissions of the transmissive window and the transmissive fluid.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
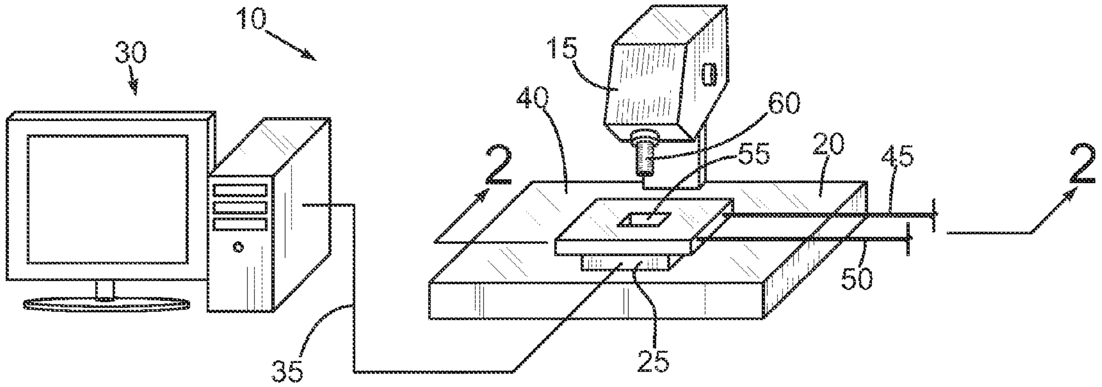
FIG. 1 is a pictorial view of an exemplary embodiment of a device under test diagnostic system.

In the drawings described below, reference numerals are generally repeated where identical elements appear in more than one figure. Turning now to the drawings, and in particular to FIG. 1, therein is shown a pictorial view of an exemplary embodiment of a semiconductor chip diagnostic system 10 that includes an infrared sensor 15 that is operable to sense infrared radiation projecting upwardly from a device under test (DUT) that is not visible in FIG. 1 but will be shown in subsequent figures. The infrared sensor 15 may be an infrared microscope or other type of infrared sensor. The system 10 includes a platform 20 that is suitable to have seated thereon a member or test circuit board 25 that may be connected to a computing device 30 that is operable to both cause the device under test (not shown) to implement certain electronic functions and to take readings therefrom and also possibly to control the operation of the microscope 15 as desired. The computing device 30 may be a general purpose computer, a dedicated computer, or other type of computing device. A data link 35 is used to connect the computing device 30 to the test board 25. The data link 35 may be a hard wired or wireless connection as desired. A temperature controlled member 40 may be seated on the diagnostic board and provided with a coolant supply and return lines 45 and 50 respectively. The temperature controlled member 40 may be a thermal plate that is provided with a window 55 through which infrared radiation may transmit up through an objective lens 60 of the microscope 15. The microscope 15 contains one or more radiation sensors (not visible). In an exemplary embodiment, the microscope sensor(s) may be a charge couple device (CCD) operable to sense infrared radiation in the 1.0 to 5.0 μm wavelength range. The CCD may include an array of pixels of virtually any number. One exemplary microscope may be the Infrascope3 model supplied by Quantum Focus Instruments Corp. of Vista, Calif.

Figure 2:
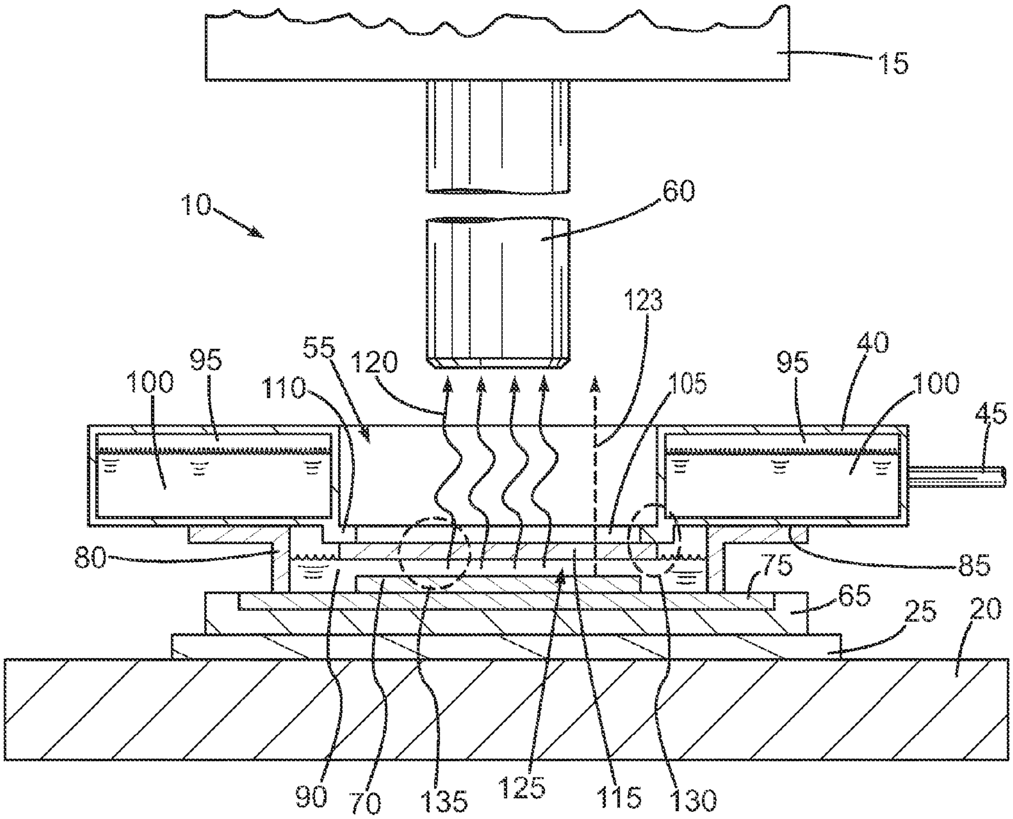
FIG. 2 is a sectional view of FIG. 1 taken at section 2-2.

Attention is now turned to FIG. 2, which is a sectional view of FIG. 1 taken at section 2-2. Note that section 2-2 passes through the thermal plate 40, the test board 25 and the platform 20. The member or test board 25 is designed to hold a semiconductor chip or DUT 70. The test board 25 may be provided with a socket 65 that is operable to receive a semiconductor chip package substrate 75 upon which the DUT 70 is mounted. The DUT 70 may be a semiconductor chip, multiple such semiconductor chips, a circuit board or virtually any other device. A compression ring 80 is mounted to the semiconductor package substrate 75. The compression ring 80 serves two functions: first to provide an upper seating surface 85 upon which the thermal plate 40 may be seated; and second to provide a bath in which a liquid 90 may be filled to provide an infrared transmissive but thermally conductive liquid medium to transfer heat away from the DUT 70. The compression ring 80 may be fabricated from a variety of materials such as, for example, copper, brass, aluminum, nickel, combinations or laminates of these or the like. The transmissive fluid 90 may be a Galden® liquid or other infrared transmissive fluid. Galden® liquids are low molecular weight perfluoropolyether (PFPE) fluids having the general chemical structure of:

$$CF_3-[(O-\underset{\displaystyle CF_3}{\underset{|}{CF}}-CF_2)m-(O-CF_2)n]O-CF_3.$$

The thermal plate 40 is provided with one or more internal chambers, one of which is shown and labeled 95 that are operable to provide a circulation of cooling or heating fluid 100 in the thermal plate 40. Note that in this view, the supply/return line 45 is visible. The window 55 extends downwardly to a central bore 105 that is slightly smaller in diameter than the window 55 itself. The thermal plate 40 has a lower projection 110 that extends downwardly and encompasses the bore 105. The thermal plate 40 may be fabricated from a variety of materials, such as copper, brass, aluminum, nickel, combinations or laminates of these or the like. A transmissive window 115 is coupled to the projection 110. The transmissive window 115 is advantageously fabricated from a material that is highly transmissive of infrared radiation 120 that will be picked up by the objective lens 60 and sensed and analyzed by the microscope 15 and computing device 30 depicted in FIG. 1. Exemplary materials for the transmissive window 115 include diamond, sapphire, silicon or the like. Note that the compression ring 80 is provided with a height sufficient to elevate the transmissive window 115 above the device under test 75 so as to leave a small gap 125 between the two. The gap 125 is provided in order to eliminate or reduce the unwanted effects of Newton's rings that would otherwise be presented to the objective lens 60 due to non-planarity of the device under test 75 and/or the transmissive window 115. The transmissive fluid 90 serves as heat conductive and radiation transmissive film in the gap 125. In the setup depicted in FIG. 2, an optical pathway 123 to the camera 15 includes the transmissive fluid 90 and the transmissive window 115. The semiconductor chip 75 is also in the optical pathway 123. As described in more detail below, the infrared radiation 120 that actually traverses the optical pathway 123 and actually reaches the objective lens 60 and camera 15 will be an amalgam of infrared radiation emitted from the device under test 75, the liquid 90, and the transmissive window 115.

Note the locations of the dashed ovals 130 and 135. The portion of FIG. 2 circumscribed by the dashed oval 135 will be shown at greater magnification in FIG. 4 and used to describe in more detail the emission and absorption of infrared radiation from the various components depicted in FIG. 2. The dashed oval 130 will be shown at greater magnification in FIG. 3 and used to describe in more detail the coupling between the transmissive window 115 and the projection 110 of the thermal plate 40.

Figure 3:
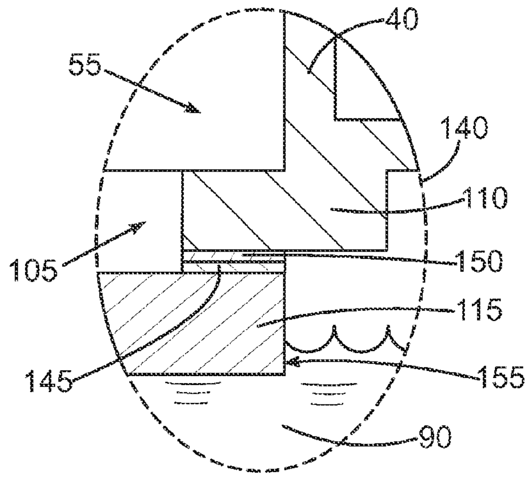
FIG. 3 is a portion of FIG. 2 shown at greater magnification.

Attention is now turned to FIG. 3, which as just noted, is the portion of FIG. 2 circumscribed by the dashed oval 130 shown at greater magnification. The location of the dashed oval 130 is such that a small portion of the thermal plate 40 including a right hand side of the projection 110, as well as small portions of the window 55, the bore 105 and the transmissive window 115 are visible. The transmissive window 115 may be supplied with one or more metal rings, one of which is shown and labeled 145 and joined to the projection 110 of the thermal plate 40 by way of an adhesion layer 150, composed of solder or an adhesive or other well known fastening materials. The metal ring 145 may be fabricated from a variety of materials that are suitable to both adhere to the transmissive window 115 as well as whatever material is used to secure the ring 145 to the projection 110. Examples include gold, silver, copper, aluminum, combinations of these or the like. In an exemplary embodiment in which the transmissive window 115 is composed of diamond, the ring 145 may be composed of gold. Well known flash plating or other gold application techniques may be used. The liquid 90 may be filled to at least to a right edge 155 of the transmissive window or all the way up to the projection 110 as desired.

Figure 4:
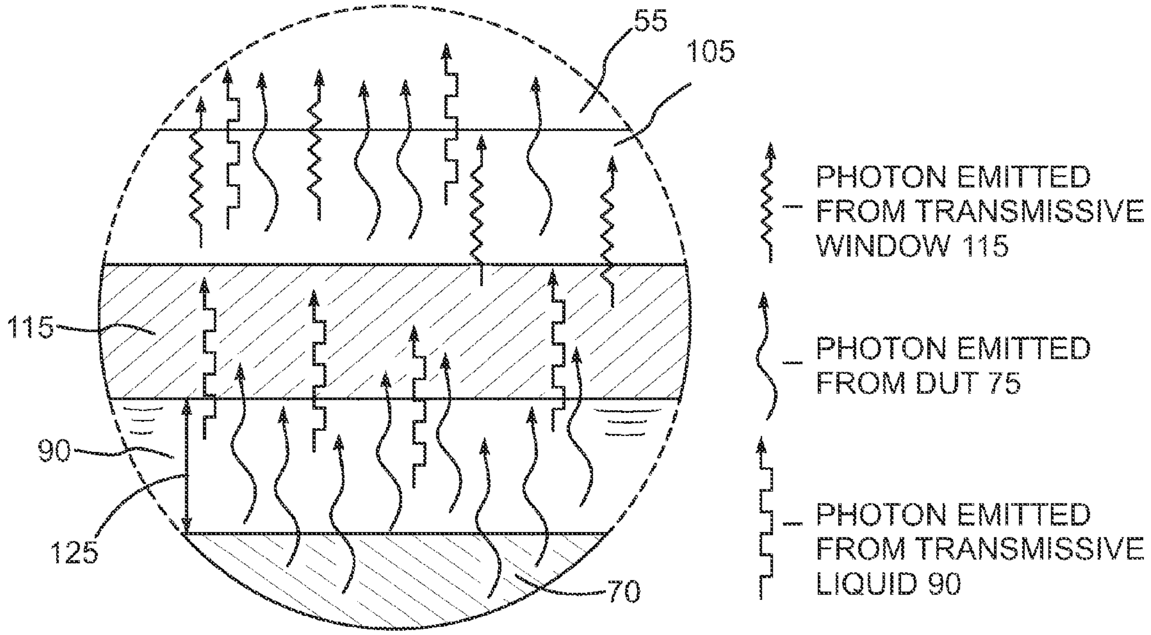
FIG. 4 is another portion of FIG. 2 shown at greater magnification.

The behavior of the various infrared emissions and absorptions associated with the components in FIG. 2 will now be described in conjunction with FIG. 4, which is the portion of FIG. 2 circumscribed by the dashed oval 135 shown at greater magnification. In order to distinguish between various photons, different symbols are used for photons emitted from the transmissive window 115, photons emitted from the device under test 75 and photons emitted from the liquid 90. These various discrete symbols are shown in the key in FIG. 4. The device under test 75 will emit infrared photons as a function of temperature. Some of these photons will be absorbed or reflected by the liquid 90 and others will be absorbed or reflected by the transmissive window 115. Thus, the total number of infrared photons that actually pass through the transmissive window 115 and up through the bore 105 and the window 55 to the objective lens 60 shown in FIG. 2 is actually some fraction of the total infrared emission of the device under test 75. However, both the liquid 90 and the transmissive window 15 also emit photons that pass through the bore 105 and the window 55 and reach the objective lens 60. Thus, the total infrared radiation that reaches the objective lens 60 is an amalgam of: (1) the photons that are emitted by the device under test 75 and that are not absorbed or reflected by either the liquid 90 or the transmissive window 115; (2) the photons that are emitted by the transmissive window 115; and (3) a fraction of those photons that are emitted by the transmissive fluid 90 since some of the photons emitted by the transmissive fluid 90 are absorbed or reflected by the transmissive window 115. The techniques disclosed herein provide for a calibration so that the mixed population of infrared photons that actually reach the objective lens 60 can be parsed appropriately so that the actual photon count from the device under test 75 may be accurately read and thus provide an accurate diagnostic of the operation of the device under test 75.

An objective of the techniques disclosed herein is to measure a photon count with the microscope 15 (see FIG. 1) and map that photon count to a particular temperature in a DUT undergoing testing. For any photon radiator, the following expression applies:

$$R=e\sigma T^4 \tag{1}$$

where R is the radiance of the radiator, e is the emissivity of the radiator, σ is the Stefan-Boltzmann constant, and T is the temperature of the radiator in Celsius or Kelvins. The radiance R is normally expressed in units of $W/cm^2$. However, any arbitrary unit may be used, such as total photon count, average photon count per sensor pixel or something else. The value of e varies with the composition and temperature of the radiator. Thus, it will be useful to obtain a data set to calibrate the lens 60 and the microscope 15 (see FIG. 1) based on a black body radiator and thereafter use that data set to determine temperatures of the DUT 70 (see FIG. 2) from photon counts of the DUT 70 during an electrical test thereof. The calibration procedure will account for the emission and absorption effects associated with the liquid 90 and the transmissive window 115.

The goal is to calibrate for the emission/absorbance characteristics of the components positioned in the pathway between the DUT 70 and the lens 60. As noted above, the presence of the components in the pathway between the DUT 70 and the lens 60 masks the actual photon count from the DUT 70 since the transmissive window 115 and the transmissive fluid both absorb and reflect some of the photons emitted by the DUT 70, both emit some photons themselves, and the transmissive window absorbs and reflects some of the photons emitted by the transmissive fluid 90. The relationship between the photon counts measured by the camera 15 and the actual photons emitted by the DUT 70 is given by:

$$MPC=t_w t_f APC+b_w(T)+b_f(T) \tag{2}$$

where MPC is measured photon counts, $t_w$ is the transmission of the transmissive window 115, $t_f$ is the transmission of the transmissive fluid 90, APC is the actual photon counts, $b_d(T)$ is the emission of the transmissive window 115, $b_f(T)$ is the emission of the transmissive fluid 90, and T is the temperature. The transmission of a given film, either the transmissive window 115 or the transmissive fluid 90, is a measure of radiation reflected and absorbed by the film. Using the transmissive window 115 as an example, the transmission $t_w$ is given by:

$$t_w=1-a_w-r_w \tag{3}$$

where $a_w$ is the absorption by the transmissive window 115 and $r_w$ is the reflectance by the transmissive window 115. The parameters $t_w$, $a_w$ and $r_w$ may be determined experimentally.

The quantities $t_w$, $t_f$, $b_d(T)$ and $b_f(T)$ may be determined experimentally as described below. Note from Equation 1 that the emissions $b_f(T)$ and $b_d(T)$ of the transmissive fluid 90 and the transmissive window 115 are functions of temperature T while the transmissions $t_w$ and $t_f$ of the transmissive window 115 and the transmissive fluid 90 are not dependent on temperature. Applicants have determined experimentally that the transmissions $t_w$ and $t_f$ for a transmissive window 115 composed of diamond and a transmissive fluid 90 composed of a Galden fluid are independent of temperature. The experiment to examine the impact of temperature on transmission involved sandwiching the transmissive window 115 and the fluid 90 between a radiation sensor, such as the camera 15 shown in FIG. 2, and a light source (not shown) and measuring the radiation reaching the sensor at various temperatures. The sensor was capable of Fourier transform infrared analysis. The results of the experiment established the temperature independence.

Calibration of Camera, Transmissive Window and Transmissive Fluid

In an exemplary embodiment, photon counts are taken from an experimental setup that initially includes just a black body emissivity target. Thereafter, additional components that affect the actual photon count, e.g., the transmissive window 115 and the transmissive fluid 90, are added to basic setup and photon counts are measured after each component is added. The result is a data set for a given temperature.

Figure 5:
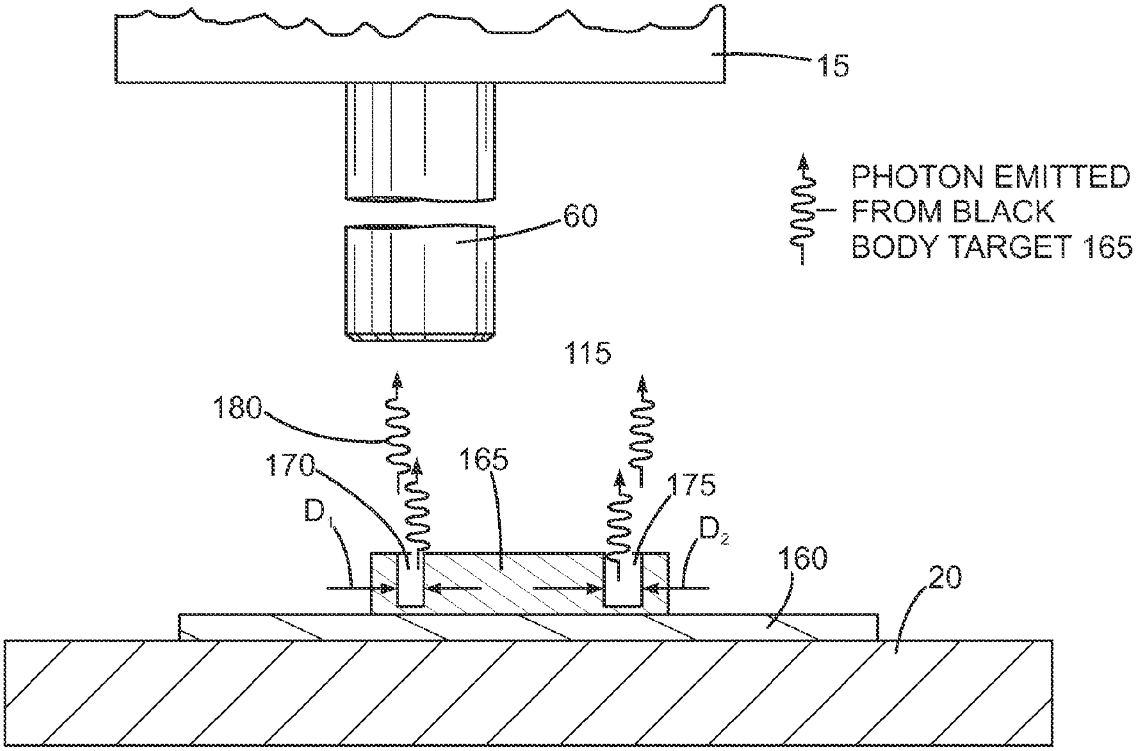
FIG. 5 is a sectional view of an exemplary embodiment of an emissivity target calibration setup.

The basic initial experimental setup is illustrated in FIG. 5, which is a sectional view like FIG. 2, but of an exemplary emissivity target calibration setup which includes a platform, which may be the same platform 20 depicted elsewhere, a heater stage 160 positioned on the platform 20, the aforementioned compression ring 80 seated on the heater stage 160, and the thermal plate 40 seated on the compression ring 80 but without need for the transmissive fluid 90 (see FIG. 2) at this point. In this calibration setup, in lieu of a device under test, an emissivity or black body target plate 165 is seated on the heater stage 160. The emissivity target 165 is advantageously composed of a material(s) that is relatively thermally conductive, such as copper, gold, platinum, silver, nickel, combinations of these or the like. A black coating may be applied to the target 165 to enhance the black body effect. The black body target plate 165 may be provided with plural openings, two of which are visible in the sectional view in FIG. 5 and labeled 170 and 175 respectively. The opening 170 may be provided with a diameter $D_1$ that may be selected to correspond roughly in size to the field of view of the objective lens 60. The additional opening 175 may be provided with an opening diameter, $D_2$, that may correspond in size to a field of view of an additional objective lens on the microscope system that is not shown in FIG. 1. In this regard, the skilled artisan will appreciate that the microscope system 15 depicted in FIG. 1 may actually include several objective lenses that may be selectively used to focus on particular targets. A thermal grease (not shown) may be applied between the plate 165 and the heater stage 160 in order to facilitate the flow of heat from the stage 160 to the plate 165.

To obtain photon emission data for the target 165 alone, the heater stage 160 may be brought up to a first selected temperature to in-turn bring the plate 165 up to a first selected temperature. The temperature in the target 165 may be sensed via a thermocouple or other sensor (not shown) associated with the target 165. When the selected temperature is reached, the infrared radiation 180 emanating from the opening 170 may be picked up by the objective lens (shown broken in this and subsequent figures) 60 and the camera 15. The microscope 15 will determine a photon count for some selected period of time t. In this illustrative embodiment, the time t may be about 2.0 seconds. The foregoing steps may then be repeated at two or three or four additional temperatures to obtain a range of data of photon counts from the opening 170 as a function of four different temperatures.

As noted in conjunction with FIG. 5, the emissivity target plate 165 may be provided with a plurality of openings. In this regard, attention is now turned to FIG. 6, which is an overhead view of the emissivity plate 165. The aforementioned openings 170 and 175 are shown with their respective diameters $D_1$ and $D_2$. Additional openings 190 and 195 may be provided in the target plate 165 to provide the capability of calibrating additional objective lenses as necessary. The number of openings 170, 175, 190 and 195 is largely a matter of design discretion.

Determination of Transmission $t_w$ and Emission $b_w(T)$

The transmission of the transmissive window 115 $t_w$, is given by:

$$t_w = MPC_{wcold}/MPC_{blackbody} \tag{4}$$

where $MPC_{blackbody}$ is the measured counts with just the black body target 165 in place and $MPC_{wcold}$ is the measured counts with the black body target 165 heated to some temperature and the transmissive window 115 cooled via the thermal plate 40 to below an emission threshold temperature for the window 115. An exemplary temperature may be about 15° C. To obtain values of $MPC_{blackbody}$, experimental runs were performed with the basic setup shown in FIG. 5 with the black body target 165 heated to four temperatures. Three measurement runs were performed for each temperature. An objective lens 60 with a 1/2× magnification was used. The data is summarized in the following table where the values for $MPC_{blackbody}$ are an average for three runs.

TABLE 1

| Black Body Target Temperature ° C. | $MPC_{blackbody}$ |
|---|---|
| 44.7 | 1573 |
| 60.3 | 2735 |
| 75.2 | 4682 |
| 90.2 | 7575 |

Figure 7:
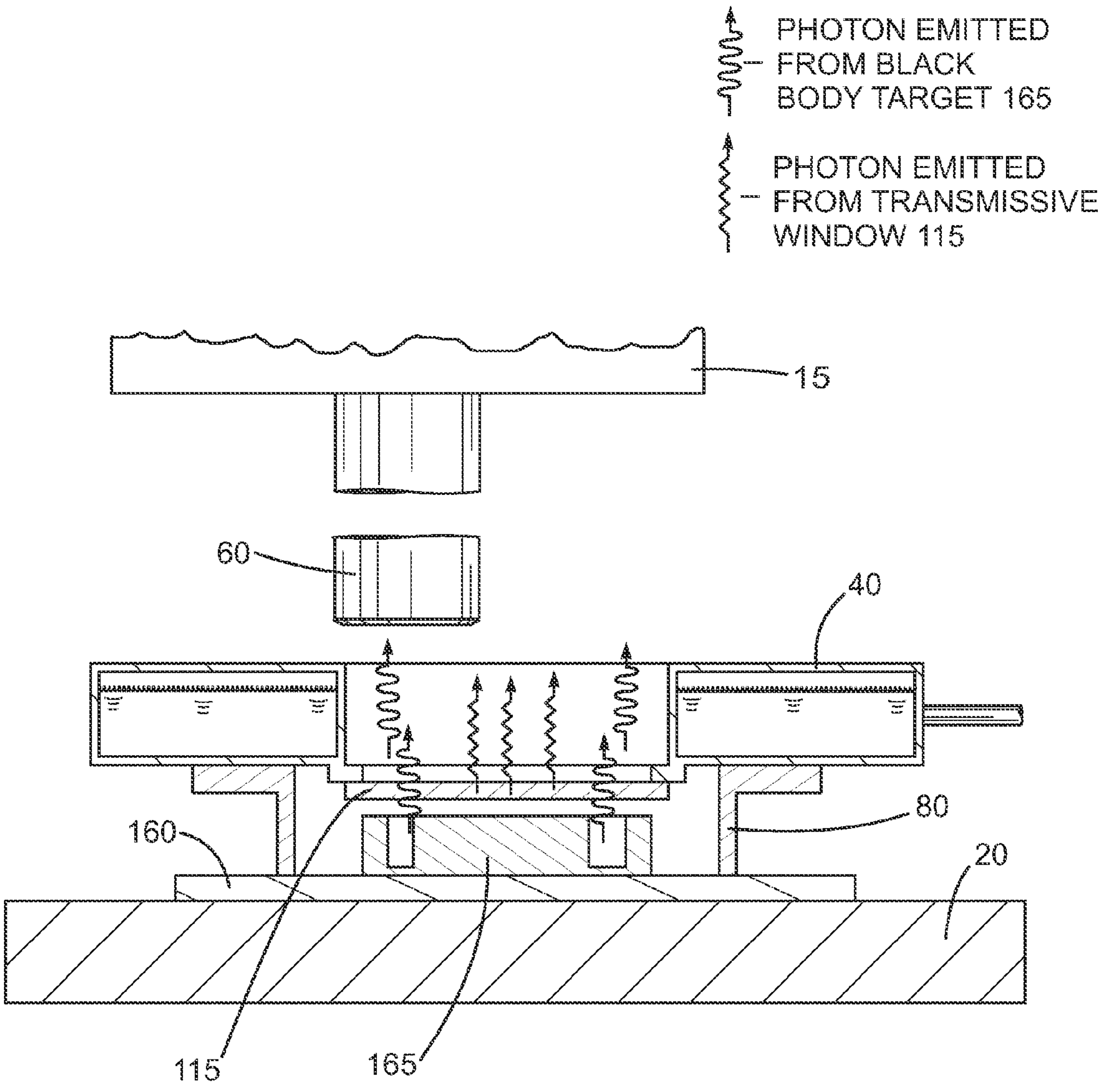
FIG. 7 is a sectional view of an exemplary embodiment of a setup for calibrating the transmission of a transmissive window.

To obtain values for $MPC_{wcold}$, two measurement runs were performed with the basic setup shown in FIG. 5 modified as shown in FIG. 7 where the transmissive window 115 and the thermal plate 40 are included between the black body target 165 and the lens 60 of the camera 15. Thermal plate 40 is seated on the compression ring 80, which is seated on the heater stage 160 and platform 20. The values for $MPC_{wcold}$ were obtained with the transmissive window 115 held at about 15° C. The transmissive window 115 will not emit at this temperature. The data is summarized in the following table where the values for $MPC_{wcold}$ are an average for the two runs:

TABLE 2

| Black Body Target Temperature ° C. | Transmissive Window Temperature ° C. | $MPC_{wcold}$ |
|---|---|---|
| 44.7 | 15 | 1234 |
| 60.3 | 15 | 2087 |
| 75.2 | 15 | 3514 |
| 90.2 | 15 | 5596 |

The data from TABLES 1 and 2 may be combined in another table as follows:

TABLE 3

| Black Body Target Temperature ° C. | $MPC_{blackbody}$ | $MPC_{wcold}$ | $t_w$ (according to Eq. 4) |
|---|---|---|---|
| 44.7 | 1573 | 1234 | 0.78 |
| 60.3 | 2735 | 2087 | 0.76 |
| 75.2 | 4682 | 3514 | 0.75 |
| 90.2 | 7575 | 5596 | 0.73 |

Determination of Emission $b_w(T)$

The emission $b_w(T)$ due to the transmissive window 115 is given by:

$$b_w(T) = MPC_{whot} - MPC_{wcold} \tag{5}$$

where $MPC_{whot}$ is the measured photon count when the transmissive window 115 is heated to a given temperature above an emission threshold temperature. In this illustrative embodiment, a temperature exceeding an emission threshold temperature for the transmissive window 115 of about 80° C. was used. The transmissive window 115 is advantageously heated to a temperature appropriate for calibrating an emissivity. The data is summarized in the following table where the values for $MC_{whot}$ are an average for three runs:

TABLE 4

| Black Body Target Temperature ° C. | Transmissive Window Temperature ° C. | $MPC_{whot}$ | $MPC_{wcold}$ (from TABLE 3) | $b_w(T)$ (according to Eq. 5) |
|---|---|---|---|---|
| 44.7 | 80 | 1985 | 1234 | 751 |
| 60.3 | | 2848 | 2087 | 761 |
| 75.2 | | 4269 | 3514 | 755 |
| 90.2 | | 6358 | 5596 | 762 |

Determination of the Transmission $t_f$ of the Transmissive Fluid

Figure 6:
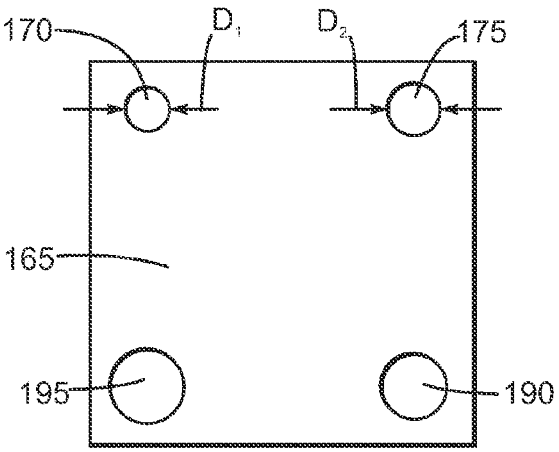
FIG. 6 is an overhead view of an exemplary emissivity target.
Figure 8:
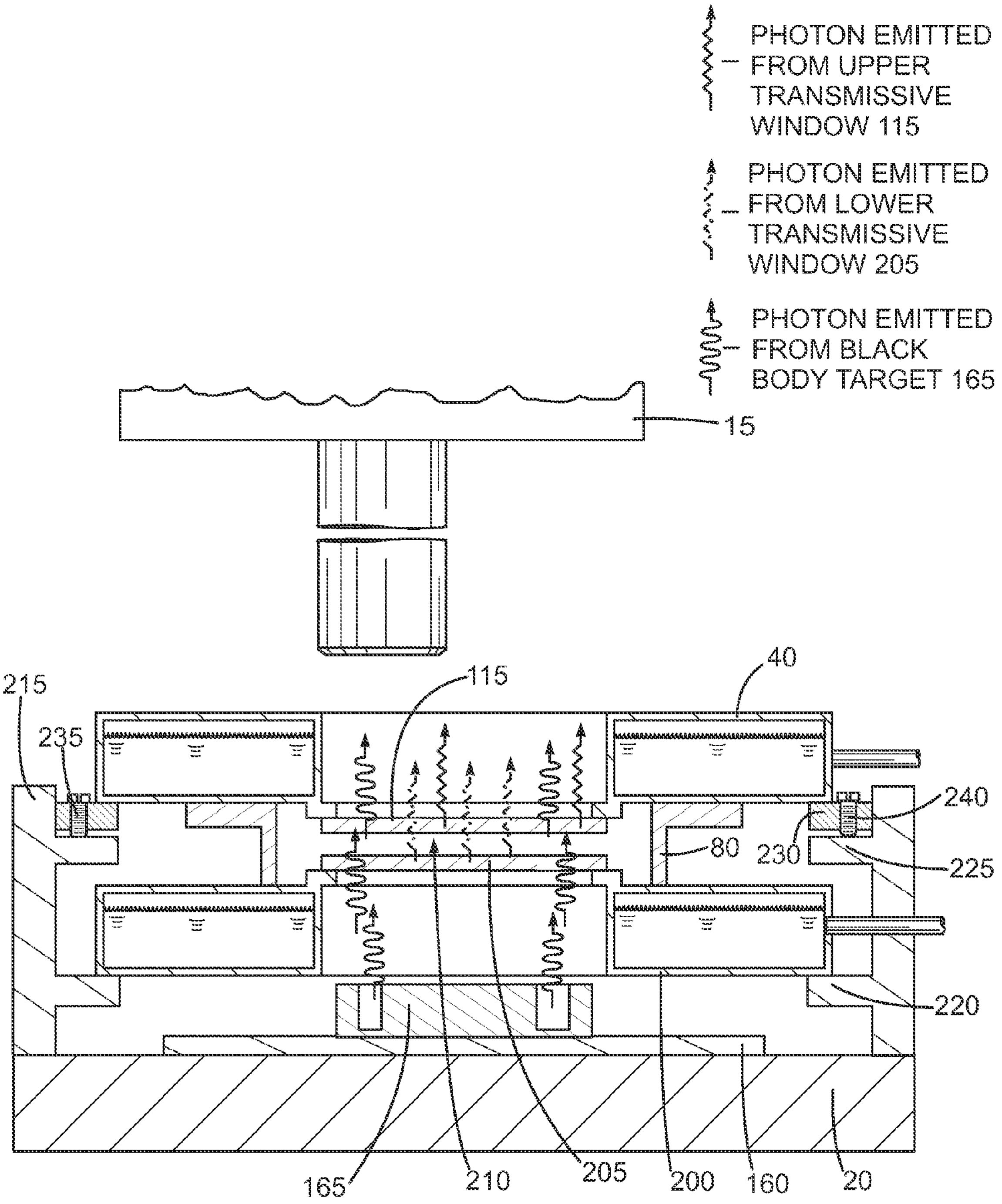
FIG. 8 is a sectional view of an exemplary embodiment of a setup for calibrating the transmission of dual transmissive windows.
Figure 9:
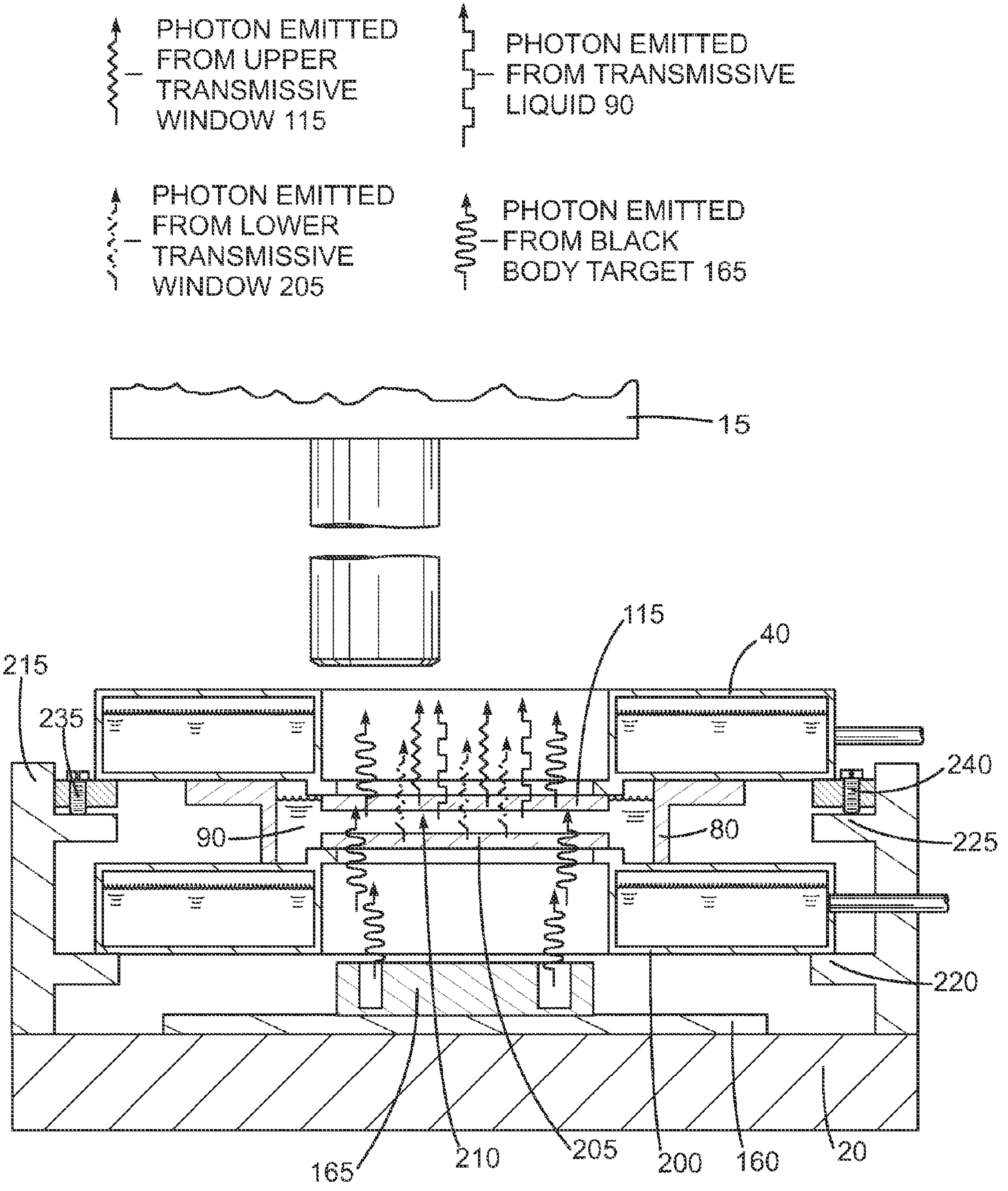
FIG. 9 is a sectional view of an exemplary embodiment of a setup for calibrating the transmission of dual transmissive windows and a transmissive fluid.

The determination of the transmission $t_f$ and the emission $b_f(T)$ due to the transmissive fluid 90 requires more complicated experimental setups than the setup depicted in FIG. 6. Two exemplary setups are depicted in FIGS. 8 and 9, respectively. In each of the setups, two thermal plates 40 and 200 are stacked over the black body target 165 such that the transmissive window 115 of one thermal plate 40 is facing towards but separated from a transmissive window 205 of the other thermal plate 200 by a gap 210. The thermal plates 40 and 200 may be substantially identical in construction with one thermal plate 200 flipped over relative to the other thermal plate 40. The thermal plates 40 and 200 may be supported by a frame 215 that may be seated on the platform 20 and include a support 220 for the thermal plate 200 and a support 225 for the thermal plate 40. An adjustment member 230 may be interposed between the thermal plate 40 and the support 225 and fitted with one or more set screws 235 and 240. The adjustment member 230 may be a ring coupled to both set screws 235 and 240, or discrete pieces, one for each set screw 235 and 240. The set screws 235 and 240 may be turned to adjust the vertical position of the thermal plate 40, and thus the vertical dimension of the gap 210. Of course, a myriad of designs could be used to support the thermal plates 40 and 200. For ease of illustration, the gap 210 is shown greatly exaggerated in size. The gap 210 should have about the same vertical dimension as the gap 125 in FIG. 2. In an exemplary embodiment the gap 210 may be about 120.0 microns, though other sizes are possible.

Note that the setups in FIGS. 8 and 9 each include the compression ring 80. The setup shown in FIG. 9 includes the transmissive fluid 90 in the gap 210 and contained by the compression ring 80. The second transmissive window 205 is necessary at this phase so that a transmissive pathway exists for photons from the black body target 165 to the transmissive fluid 90 and the transmissive window 115. Although data will eventually be taken using the setup in FIG. 9, the transmission characteristics of just the two windows 115 and 205 must first be determined using the setup of FIG. 8.

It will be necessary to first establish baseline photon counts for the dual transmissive windows 115 and 205 at cold and hot temperatures and without the transmissive fluid 90 in place. Using the setup depicted in FIG. 8, the black body target 165 is again heated to four temperatures using the heater stage 160. This time, both windows 115 and 205 are held at a constant low temperature of about 15° C. and dual transmissive window photon counts, $MPC_{wwcold}$, are measured by the camera 15, where “wwcold” denotes a window-window cold arrangement. Although FIG. 8 depicts emission of photons from both the transmissive windows 115 and 205 for purposes of illustrating the next step, there will not be such emissions at 15° C. Next, the black body target 165 is heated to each of the four temperatures while the dual transmissive windows 115 and 205 are heated to a temperature appropriate for an emissivity calibration and dual transmissive window photon counts, $MPC_{wwhot}$, are recorded, where “wwhot” denotes a window-window hot arrangement. In an exemplary embodiment, the dual transmissive windows 115 and 205 are heated to about 80° C. With both transmissive windows 115 and 205 heated to at least 45° C., there will be photons emitted from each as depicted in FIG. 8. The data is summarized in the following two tables where the values for $MC_{wwcold}$ and $MC_{wwhot}$ are each an average for three experimental runs:

TABLE 5

| Temperature of Black Body Target ° C. | $MC_{wwcold}$ (both transmissive windows @ 15° C.) |
|---|---|
| 45 | 1129 |
| 60.2 | 1813 |
| 75.2 | 2910 |
| 90.1 | 4500 |

TABLE 6

| Temperature of Black Body Target° C. | $MC_{wwhot}$ (both transmissive windows @ 80° C.) |
|---|---|
| 45 | 2530 |
| 60.2 | 3206 |
| 75.2 | 4286 |
| 90.1 | 5882 |

With data in hand for the measure photon count with the dual transmissive windows 115 and 205 but without the transmissive fluid 90, the calibration procedure is switched to the setup depicted in FIG. 9 with the transmissive fluid 90 in place. Again, the black body target 165 is heated to four temperatures using the heater stage 160, while the combination of the dual transmissive windows 115 and 205 and the transmissive fluid 90 is held to about 15° C. and photon counts, $MC_{wfwcold}$, are measured by the camera 15, where “wfwcold” denotes a window-fluid-window cold setup. Next, the black body target 165 heated to the four temperatures while the transmissive windows 115 and 205, and the transmissive fluid 90 are heated to a temperature appropriate for an emissivity calibration and photon counts, $MC_{wfwhot}$, are measured, where “wfwhot” denotes a window-fluid-window hot setup. The data is summarized in the following two tables where the values $MC_{wfwcold}$ and $MC_{wfwhot}$ are each an average for three experimental runs:

TABLE 7

| Temperature of Black Body Target ° C. | $MC_{wfwcold}$ (dual transmissive windows and transmissive fluid @ 15° C.) |
|---|---|
| 45 | 1054 |
| 60.2 | 1696 |
| 75.2 | 2725 |
| 90.1 | 4256 |

TABLE 8

| Temperature of Black Body Target ° C. | $MC_{wfwhot}$ (dual transmissive windows and transmissive fluid @ 80° C.) |
|---|---|
| 44.9 | 3362 |
| 60.2 | 3991 |

TABLE 8-continued

| Temperature of Black Body Target ° C. | $MC_{wfwhot}$ (dual transmissive windows and transmissive fluid @ 80° C.) |
|---|---|
| 75.1 | 5014 |
| 90.2 | 6533 |

It will be useful at this point to combine the data from TABLES 5, 6, 7 and 8 into TABLE 9 as follows:

TABLE 9

| $MC_{wwcold}$ | $MC_{wwhot}$ | $MC_{wfwcold}$ | $MC_{wfwhot}$ |
|---|---|---|---|
| 1129 | 2530 | 1054 | 3362 |
| 1813 | 3206 | 1696 | 3991 |
| 2910 | 4286 | 2725 | 5014 |
| 4500 | 5882 | 4256 | 6533 |

A few qualitative observations may be made about the data in TABLE 9. First, the addition of the transmissive fluid 90 caused the photon counts to go down slightly. For example, at a temperature of 45° C., the photon counts decreased from 1129 without the fluid to 1054 with the fluid, a drop of 75 photons. At a temperature of 60.2° C., the photon counts decreased from 1813 to 1696, a difference of 117 photons. Qualitatively, the decrease in photon counts with the addition of the fluid 90 makes sense since the fluid 90 is absorbing some photons. However, the applicants have also discovered that the thickness of the transmissive fluid 90 can impact the measured counts in a counterintuitive way. If the thickness of the fluid 90 is dropped from about 120.0 microns to about 30.0 microns, the measured counts $MC_{wfwcold}$ with dual windows 115 and 205 and fluid 90 becomes larger than the measured counts $MC_{wwcold}$ with just two windows 115 and 205. Applicants believe the increase is due to the fluid 90 reducing the reflectance of the interface between the top transmissive window 115 and the fluid 90. Second, heating the transmissive fluid 90 produces more fluid emission as evidence by the larger counts with fluid $MC_{wfwhot}$ versus counts without fluid $MC_{wwhot}$.

With the data from TABLE 9 in hand, the transmission $t_f$ and the emission $b_f(T)$ due to the transmissive fluid 90 may be calculated. The fluid transmission $t_f$ is given by:

$$t_f = MC_{wfwcold}/MC_{wwcold} \tag{6}$$

and the fluid emission $b_f(T)$ is given by:

$$b_f(T) = MC_{wfwhot} - (MC_{wwhot})(t_f) \tag{7}$$

Plugging the data from TABLE 9 into Equations 6 and 7 yields:

TABLE 10

| Temperature of Black Body Target and dual transmissive windows and transmissive fluid ° C. | Transmission of fluid $t_f$ | Emission of fluid $b_f(T)$ |
|---|---|---|
| 44.9 | 0.9336 | 1000 |
| 60.2 | 0.9355 | 991 |
| 75.1 | 0.9364 | 1000 |
| 90.2 | 0.9458 | 969 |

The quantities $t_w$, $t_f$, $b_w(T)$ and $b_f(T)$ set forth in TABLES 3, 4 and 10 satisfy Equation 2 and characterize the general transmission and emission characteristics of the transmissive window 115 and the transmissive fluid 90. The data and Equation 1 may be used to calibrate the photon measurement for an actual sample or DUT.

Calibration of a DUT

To calibrate an actual sample or DUT 70, the basic setup depicted in FIG. 2 may be used where the DUT 70 is positioned in the optical pathway 123. The DUT 70, the transmissive fluid 90, and the transmissive window 115 are heated to some temperature, for example 80° C., and measured photon counts $MPC_{pixel}$ are taken on a per pixel basis. The heat may be supplied by the thermal plate 40. During the measurement, the DUT 70 chip is substantially isothermal. If desired, the measurement may be repeated at other temperatures of interest. The photon counts $MPC_{pixel}$ measured during the test are run through Equation 2 using the data from TABLES 3, 4 and 10 to yield an actual photon count per pixel $APC_{pixel}$ at a set temperature T, in this case 80° C. The basic radiance equation, Equation 1, may be modified and used to solve for emissivity on a per pixel basis as follows:

$$R_{pixel} = APC_{pixel} = e_{pixel}\sigma T^4 \tag{8}$$

Rearranging Yields:

$$e_{pixel} = APC_{pixel}/\sigma T^4 \tag{9}$$

Actual Temperature Measurement on a DUT

Still referring to FIG. 2, to make actual temperature measurements on the DUT 70, the transmissive window 115 and the transmissive fluid 90 are kept cool, at perhaps 15° C., by appropriate coolant circulation in the thermal plate 40. The DUT 70 is caused to perform one or more test patterns or scripts via the computing device 30 shown in FIG. 1 and photon counts $MPC_{pixeldata}$ are measured on a per pixel basis. The transmissive window 115 and the transmissive fluid 90 act as transmissive heat sinks for the DUT 70, which is generating heat non-uniformly across its surface. Since both the transmissive window 115 and the transmissive fluid 90 are cooled, there should be no emission by either. Accordingly, the terms $b_f(T)$ and $b_w(T)$ from Equation 2 are set to zero. The terms $t_w$ and $t_f$ from Tables 3 and 10 may be used to convert measured photon counts $MPC_{pixeldata}$ to actual photon counts $APC_{pixeldata}$ using Equation 2. The actual photon counts $APC_{pixeldata}$ and the emissivity per pixel values $e_{pixel}$ from Equation 9 may be used to solve for a temperature at a given pixel to yield a temperature map of the DUT 70.

Referring again to FIG. 1, the computing device 30 may be provided with instructions to enable the automated gathering of data and calculations necessary to solve for the variables in Equations 2-9 and, if desired, create and store the calculated variables for subsequent temperature mapping of a given semiconductor chip. The data may be stored in the form of look-up tables or the like. The instructions and data may be stored in a computer readable medium associated with the computing device 30.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method, comprising:

determining a transmission of a transmissive window and a transmission of a transmissive fluid;

determining an infrared emission of the transmissive window and an infrared emission of the transmissive fluid for at least one temperature;

in a system having an infrared sensor and an optical pathway to the infrared sensor, placing the transmissive window and the transmissive fluid in the optical pathway;

placing a semiconductor chip in the optical pathway proximate the transmissive fluid;

measuring radiation from the optical pathway with the infrared sensor; and determining an emissivity of the semiconductor chip using the measured radiation and the determined transmissions and emissions of the transmissive window and the transmissive fluid.

2. The method of claim 1, wherein the transmissive window comprises a diamond window.

3. The method of claim 1, comprising determining an emissivity of the semiconductor chip on a per pixel basis.

4. The method of claim 3, comprising determining a temperature of the semiconductor chip on a per pixel basis using the per pixel basis emissivities.

5. The method of claim 1, wherein the determining of the transmission of the transmissive window comprises, before placing the semiconductor chip, the transmissive window and the transmissive fluid, heating an emissivity target exhibiting black body characteristics, measuring an emission of the heated emissivity target, and thereafter placing the transmissive window between the emissivity target and the infrared sensor, cooling the transmissive window to below an emission threshold temperature, measuring radiation transmitted from the transmissive window, and dividing the measured radiation by the measured emission of the emissivity target.

6. The method of claim 1, wherein the determining of the transmission of the transmissive window comprises, before placing the semiconductor chip and the transmissive fluid, heating an emissivity target exhibiting black body characteristics, measuring an emission of the heated emissivity target, and thereafter placing the transmissive window between the emissivity target and the infrared sensor, cooling the transmissive window to below an emission threshold temperature, measuring radiation transmitted from the transmissive window, heating the transmissive window above at least one emission threshold temperature, measuring radiation transmitted from the transmissive window, and determining a difference between the measured transmitted radiation of the transmissive window at below and above the emission threshold temperature.

7. The method of claim 1, wherein the transmissive fluid comprises a low molecular weight perfluoropolyether (PFPE) fluid having the general chemical structure of:

$$CF_3—[(O—\underset{\displaystyle CF_3}{\underset{|}{CF}}—CF_2)m—(O—CF_2)n]O—CF_3.$$

8. The method of claim 1, wherein the infrared sensor comprises an infrared camera.

9. A method, comprising:

determining a transmission $t_w$ of a transmissive window and a transmission $t_f$ of a transmissive fluid;

determining an infrared emission $b_w$ (T) of the transmissive window and an infrared emission $b_f$(T) of the transmissive fluid for at least one temperature;

in a system having an infrared sensor and an optical pathway to the infrared sensor, placing the transmissive window and the transmissive fluid in the optical pathway;

placing a semiconductor chip in the optical pathway proximate the transmissive fluid;

measuring a photon count MPC from the optical pathway with the infrared sensor; and determining actual an photon count APC from the semiconductor chip according to:

$$MPC=t_w t_f APC+b_w(T)+b_f(T).$$

10. The method of claim 9, comprising determining an emissivity of the semiconductor chip using APC.

11. The method of claim 10, comprising determining the emissivity of the semiconductor chip on a per pixel basis.

12. The method of claim 11, comprising determining a temperature of the semiconductor chip on a per pixel basis using the per pixel basis emissivities.

13. The method of claim 9, wherein the determining of $t_w$ comprises, before placing the semiconductor chip, the transmissive window and the transmissive fluid, heating an emissivity target exhibiting black body characteristics, measuring an emission of the heated emissivity target, and thereafter placing the transmissive window between the emissivity target and the infrared sensor, cooling the transmissive window to below an emission threshold temperature, measuring radiation transmitted from the transmissive window, and dividing the measured radiation by the measured emission of the emissivity target.

14. The method of claim 9, wherein the determining of $b_w$(T) comprises, before placing the semiconductor chip and the transmissive fluid, heating an emissivity target exhibiting black body characteristics, measuring an emission of the heated emissivity target, and thereafter placing the transmissive window between the emissivity target and the infrared sensor, cooling the transmissive window to below an emission threshold temperature, measuring radiation transmitted from the transmissive window, heating the transmissive window above at least one emission threshold temperature, measuring radiation transmitted from the transmissive window, and determining a difference between the measured transmitted radiation of the transmissive window at below and above the emission threshold temperature.

15. The method of claim 9, wherein the transmissive window comprises a diamond window.

16. The method of claim 9, wherein the transmissive fluid comprises a low molecular weight perfluoropolyether (PFPE) fluid having the general chemical structure of:

$$CF_3—[(O—\underset{\displaystyle CF_3}{\underset{|}{CF}}—CF_2)m—(O—CF_2)n]O—CF_3.$$

17. The method of claim 9, wherein the infrared sensor comprises an infrared camera.

18. An apparatus, comprising:

an infrared sensor having an optical pathway;

a first member for holding a semiconductor chip in the optical pathway;

a second member for holding an infrared transmissive window in the optical pathway between the infrared sensor and the semiconductor chip, the transmissive window having a known transmission and a known emission at at least one temperature, either the first or the second member being operable to separate the transmissive window from the semiconductor by a preselected gap;

a film of infrared transmissive fluid in the preselected gap for establishing fluid communication with the semiconductor chip and the transmissive window, the infrared transmissive fluid having a known transmission and a known emission at at least one temperature; and whereby a count of photons measured by the infrared sensor may be converted to a count of photons emitted by the semiconductor chip using the known transmissions and emissions of the transmissive window and the transmissive fluid.

19. The apparatus of claim 18, wherein the transmissive window comprises a diamond window.

20. The apparatus of claim 18, comprising a computing device connected to the infrared sensor and having instructions stored in a computer readable medium operable to perform the conversion to a count of photons emitted by the semiconductor chip.

21. The apparatus of claim 20, wherein the computing device includes instructions stored in a computer readable medium operable to calculate an emissivity of the semiconductor chip and at least one temperature of the semiconductor chip from the calculated emissivity.

* * * * *